United States Patent [19]

Nguyen

[11] Patent Number: 5,553,578
[45] Date of Patent: Sep. 10, 1996

[54] WASHERLESS BLOCK HEATER

[75] Inventor: Vinh L. Nguyen, Toronto, Canada

[73] Assignee: Pyroil Canada, Mississauga, Canada

[21] Appl. No.: 547,474

[22] Filed: Oct. 24, 1995

[51] Int. Cl.$^6$ ................................................ F02N 17/02
[52] U.S. Cl. ........................... 123/142.5 E; 219/208; 392/453; 411/915
[58] Field of Search .......................... 219/208; 392/453; 123/142.5 E; 277/207 R, 210, 213; 411/915

[56] References Cited

U.S. PATENT DOCUMENTS

| | | | |
|---|---|---|---|
| 1,227,529 | 5/1917 | Clarke | 219/208 |
| 2,824,945 | 2/1958 | Derumaux | 219/208 |
| 2,832,916 | 4/1958 | Morse | 277/207 R |
| 3,171,016 | 2/1965 | Sukala | 219/208 |
| 4,159,138 | 5/1979 | Melone | 411/915 |
| 4,657,460 | 4/1987 | Bien | 411/915 |
| 4,828,275 | 5/1989 | Udagawa | 277/207 R |
| 4,948,318 | 8/1990 | Nottelmann et al. | 411/915 |

*Primary Examiner*—Erick R. Solis
*Attorney, Agent, or Firm*—Kenneth M. Garrett

[57] ABSTRACT

A washerless block heater for automotive engines includes an externally threaded nipple surrounded by a sharp shoulder, which shoulder is provided with a pair of forwardly facing ribs. When the nipple is screwed into an engine block the ribs form a seal with the block wall to resist leakage from the block and to damp the transmission of vibrational forces from the block to the heater body which tend to unscrew the heater from the block.

6 Claims, 1 Drawing Sheet

WASHERLESS BLOCK HEATER

BACKGROUND OF THE INVENTION

This invention relates to heaters of a type that are retained in a threaded bore passing through the wall of the engine block. Such heaters include a threaded nipple, an outwardly facing end portion having a diametric dimension greater than that of the nipple, and a sharp shoulder connecting the nipple and end portion. In the prior art, a washer is disposed on the nipple for compression between the shoulder and the wall of the engine block surrounding the bore. The washer provides a sealing function to prevent the escape of engine coolant from the block, and a damping function, to reduce the transmission of vibration between the engine block and the block heater which tends to loosen the seal across the interface.

The reliance upon a sealing washer is generally found to increase the installation time of the block heaters. In addition, the inadvertent loss of the sealing washer in the installation process can engender considerably increased costs to rectify the deficiency when it becomes apparent. Although it is well known to capture washers on screwed members, this tends to increase assembly costs of small assembly run items such as block heaters.

It is an object of my invention to provide washerless block heaters for automotive engines.

It is another object of my invention to provide block heaters for automotive engines that are more easily assembled into the automotive engine, with reduced margins for error.

BRIEF SUMMARY OF THE INVENTION

In accordance with one aspect of my invention, a block heater for an automotive engine includes a body of a hard malleable metal comprising an externally threaded nipple portion, an outer end portion having a diametric dimension greater than that of the nipple portion, and a sharp shoulder portion connecting the nipple portion and the end portion. First and second spaced apart ribs are raised on the shoulder portion concentric with the nipple portion. The nipple portion is received in a threaded bore in a wall of the block of an automotive engine to compress the ribs against the wall and form a damping seal therewith.

Typically, the preferred hard malleable metal from which the body of the block heater is formed will be brass, but other metals including aluminum may also be utilized.

Suitably the sealing ribs have a generally semi-circular profile each having a small diameter, typically of about 1 mm, whereby when compressed against the engine block wall, the ribs will undergo a predominantly plastic deformation without scoring of the engine block wall against which the block heater body seals.

The foregoing objects and aspects of the invention, together with other objects, aspects and advantages thereof will be more apparent from a consideration of the following description of the preferred embodiment thereof taken in conjunction with the drawings annexed hereto.

IN THE DRAWINGS

DESCRIPTION OF THE PREFERRED EMBODIMENT

Figure 1:
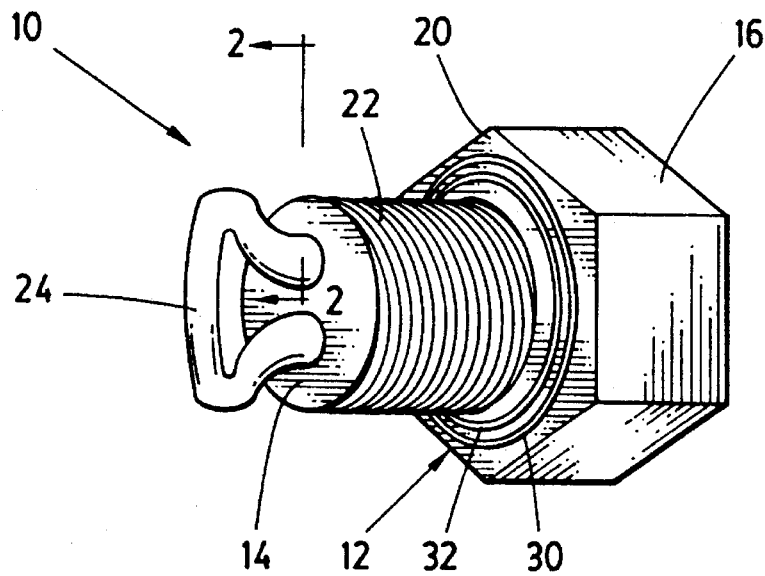
FIG. 1 shows a block heater in accordance with the invention in front perspective view.
Figure 2:
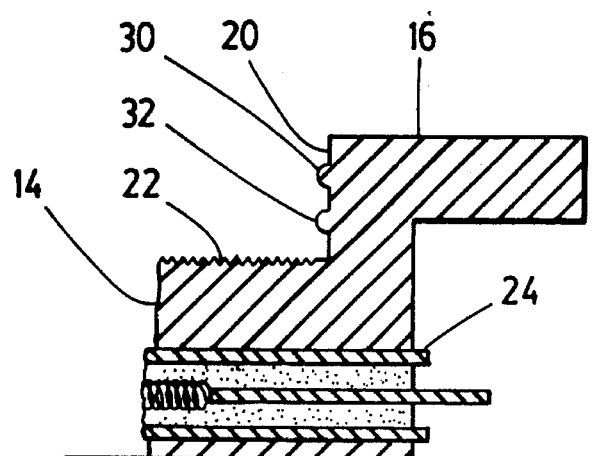
FIG. 2 is a fragmentary cross-section on line 2—2 of FIG. 1.
Figure 3:
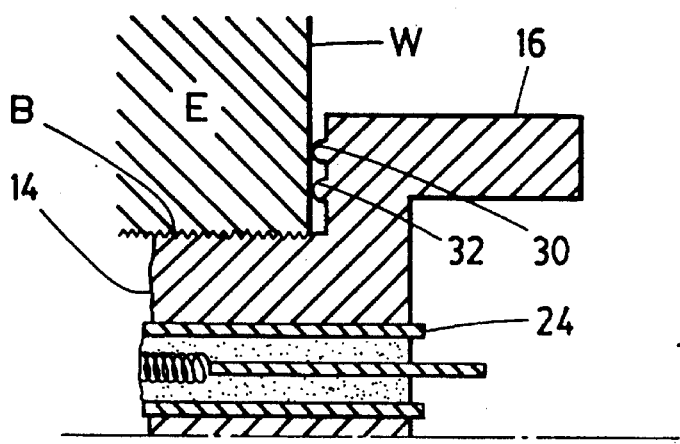
FIG. 3 is similar to FIG. 2 but shows the block heater mounted in a fragmentary portion of an automotive engine block.

Referring to the drawings in detail, an automotive engine block heater in accordance with the invention is identified generally therein by the numeral 10. Block heater 10 comprises a body 12 suitably formed from forged brass, and includes a nipple portion 14, an outwardly facing end portion 16 suitably having hexagonal cross section, which end portion has diametric dimension greater than that of nipple portion 14. A sharp shoulder portion 20 interconnects nipple portion 14 and end portion 16. Nipple portion 14 has external threads 22 along the length thereof. A hairpin immersion heater 24 is sealed to nipple portion 14 to project forwardly therefrom.

As thus far described, block heater 10 is of a wholly conventional nature, and in use a sealing washer would be employed therewith. The sealing washer is obviated in accordance with my invention by providing shoulder portion 20 with a pair of forwardly projection ribs 30, 32 concentric with nipple portion 14.

Block heater 10 is received in the threaded bore B of an engine block E, which block is defined in part by an outwardly facing wall W surrounding the bore B. A torque force applied to the block heater 10 compresses the ribs 30, 32 against wall W.

Sealing ribs 30, 32 will suitably be generally semicircular in cross section, suitably having a diameter of approximately 1 mm, so as undergo primarily a plastic deformation when compressed against the wall W. While the spacing between ribs 30, 32 is not critical, the ribs will be positioned on shoulder portion 20 in a manner to maximize the spacing therebetween, commensurate with the ribs being adequately spaced from the margins of shoulder 20. While I do not wish to be bound by theory, it appears that the different diameters on which the ribs 30, 32 are formed has a dampening effect on the transmission of vibration between engine block E and block heater 10.

It will be apparent that many changes may be made to the illustrative embodiment while falling within the scope of the invention, and it is intended that all such changes be covered by the claims appended hereto.

I claim:

1. A block heater for an automotive engine, said block heater including a body of a hard malleable metal including an externally threaded nipple portion, an outer end portion having a diametric dimension greater than that of said nipple portion, and a sharp shoulder portion connecting said nipple portion and said end portion;

first and second spaced apart ribs raised on said shoulder portion concentric with said nipple portion;

said nipple portion being receivable in a threaded bore in a wall of the block of an automotive engine to compress said ribs against said wall and form a damping seal therewith.

2. A block heater as defined in claim 1 wherein said hard malleable metal is brass.

3. A block heater as defined in claim 1 wherein said sealing ribs each have a generally semi-circular cross section.

4. In combination, an automotive engine including an engine block having a heat exchange liquid coolant within said block; said block having a threaded bore therethrough and an outwardly facing surface surrounding said bore;

an immersion heater including a body formed of a hard malleable material including an externally threaded nipple portion matable with said threaded bore and an outer end portion having a diametric dimension greater than that of said nipple portion with a sharp shoulder therebetween;

first and second spaced apart ribs raised on said sharp shoulder concentric with said nipple; said spaced apart ribs mating with said outwardly facing surface of said block to form a damping seal therebetween.

5. The combination of claim 4 wherein said hard malleable material is brass.

6. The combination of claim 4 wherein said sealing ribs each have a generally semi-circular cross section.

* * * * *